(12) United States Patent
Bolotov et al.

(10) Patent No.: US 8,302,083 B2
(45) Date of Patent: Oct. 30, 2012

(54) ARCHITECTURE AND IMPLEMENTATION METHOD OF PROGRAMMABLE ARITHMETIC CONTROLLER FOR CRYPTOGRAPHIC APPLICATIONS

(75) Inventors: Anatoli A. Bolotov, Cupertino, CA (US); Mikhail I. Grinchuk, San Jose, CA (US); Lav Ivanovic, Sunnyvale, CA (US); Alexei Galatenko, Moscow (RU)

(73) Assignee: LSI Corporation, Milpitas, CA (US)

( * ) Notice: Subject to any disclaimer, the term of this patent is extended or adjusted under 35 U.S.C. 154(b) by 935 days.

(21) Appl. No.: 12/321,643

(22) Filed: Jan. 23, 2009

(65) Prior Publication Data

US 2010/0191935 A1 Jul. 29, 2010

(51) Int. Cl.
*G06F 15/76* (2006.01)
*G06F 9/302* (2006.01)
*G06F 9/45* (2006.01)

(52) U.S. Cl. ........ 717/140; 712/208; 712/209; 712/210; 712/211; 712/212; 712/213; 717/100

(58) Field of Classification Search .................. 717/100; 712/42, E9.017
See application file for complete search history.

(56) References Cited

U.S. PATENT DOCUMENTS

| | | | | |
|---|---|---|---|---|
| 3,909,799 A * | 9/1975 | Recks et al. | ................... | 712/234 |
| 4,009,347 A * | 2/1977 | Flemming et al. | ............ | 370/321 |
| 4,328,555 A * | 5/1982 | Nussbaumer | ................. | 708/401 |
| 4,532,629 A * | 7/1985 | Furuya et al. | ................. | 714/755 |
| 4,604,695 A * | 8/1986 | Widen et al. | ................... | 711/217 |
| 2009/0133003 A1* | 5/2009 | Andreev et al. | ............... | 717/139 |

OTHER PUBLICATIONS

U.S. Appl. No. 11/944,104, filed Nov. 21, 2007, Andreev, et al.
U.S. Appl. No. 12/118,477, filed May 9, 2008, Andreev, et al.

* cited by examiner

*Primary Examiner* — Chat Do
*Assistant Examiner* — Lynda Dinh
(74) *Attorney, Agent, or Firm* — Suiter Swantz pc llo

(57) ABSTRACT

An architecture includes a controller. The controller is configured to receive a microprogram. The microprogram is configured for performing at least one of hierarchical or a sequence of polynomial computations. The architecture also includes an arithmetic logic unit (ALU) communicably coupled to the controller. The ALU is controlled by the controller. Additionally, the microprogram is compiled prior to execution by the controller, the microprogram is compiled into a plurality of binary tables, and the microprogram is programmed in a command language in which each command includes a first portion for indicating at least one of a command or data transferred to the ALU, and a second portion for including a control command to the controller. The architecture and implementation of the programmable controller may be for cryptographic applications, including those related to public key cryptography.

10 Claims, 4 Drawing Sheets

```
        IDLE         ; RETURN_IF_1;
        ONE_X        ; CALL("SF_add_X_to_L_and_lsh_ACC");
        IDLE         ; RETURN_IF_1;
        IDLE         ; CALL("SF_lsh_ACC");
        IDLE         ; JUMP_IF_0("loop_compute_L");
        IDLE         ; RETURN;

SUBFUNCTION("SF_add_X_to_L_and_lsh_ACC");
        READ_M(addr_of_L);
        MOVE_M_Y     ;
        SUBADD       ;
        SAVE_Z(addr_of_L);
SUBFUNCTION("SF_lsh_ACC");
        READ_M(addr_of_ACC);
        SAVE_2M_CUR;
        READ_M(addr_of_ACC);
        MOVE_M_X     ; RETURN;

SUBFUNCTION("SF_double_ACC");
        READ_M(addr_of_ACC  );
        MOVE_M_XY    ; CALL("SF_spec_add");
        SAVE_X(addr_of_ACC  );
        IDLE         ; RETURN;

SUBFUNCTION("SF_spec_add");
        SUBADD       ; SET_IF(port_C);
        READ_M(addr_of_P);
        MOVE_M_Y     ;
        MOVE_Z_X     ;
        IDLE         ; RETURN_IF_1;
        COMPL_X      ;
        SUBADD       ;
        MOVE_Z_X     ;
```

FIG. 4

ARCHITECTURE AND IMPLEMENTATION METHOD OF PROGRAMMABLE ARITHMETIC CONTROLLER FOR CRYPTOGRAPHIC APPLICATIONS

FIELD OF THE INVENTION

The present invention generally relates to the field of data processing, and more particularly to an architecture and implementation method for a programmable arithmetic controller.

BACKGROUND OF THE INVENTION

Cryptographic applications, including cryptosystems and cryptographic protocols, typically require various hierarchical arithmetical/polynomial computations to implement functional benefits. Such cryptographic applications may include functionality such as multiparty key exchange schemes, identity-based encryption/decryption, and other security and e-commerce-based functions. Computer systems are often used to implement the relatively complex protocols and computations.

SUMMARY OF THE INVENTION

An architecture includes a controller. The controller is configured to receive a microprogram. The microprogram is configured for performing at least one of hierarchical or a sequence of polynomial computations. The architecture also includes an arithmetic logic unit (ALU) communicably coupled to the controller. The ALU is controlled by the controller. Additionally, the microprogram is compiled prior to execution by the controller, the microprogram is compiled into a plurality of binary tables, and the microprogram is programmed in a command language in which each command includes a first portion for indicating at least one of a command or data transferred to the ALU, and a second portion for including a control command to the controller.

A method includes programming a microprogram in a command language in which each microprogram command includes a first portion for indicating at least one of a command or data transferred to an arithmetic logic unit (ALU), and a second portion for including a control command to a controller. The method also includes compiling the microprogram into a plurality of binary tables. The microprogram is configured for performing at least one of hierarchical or a sequence of polynomial computations. The method further includes executing the microprogram by a controller, configuring at least one of the plurality of binary tables for including the code of the microprogram, and configuring at least one of the plurality of binary tables for storing at least one address of a command labeled in the microprogram.

A system includes a controller. The controller is configured to receive a microprogram. The microprogram is configured for performing at least one of hierarchical or a sequence of polynomial computations. The system also includes an arithmetic logic unit (ALU) communicably coupled to the controller. The ALU is controlled by the controller. The system further includes a command register communicably coupled to the controller, the command register controlled by the controller and configured for storing at least one of input data, output data, or internal registers. Additionally, the microprogram is compiled prior to execution by the controller, the microprogram is compiled into four binary tables, and the microprogram is programmed in a command language in which each command includes a first portion for indicating at least one of a command or data transferred to the ALU, and a second portion for including a control command to the controller.

It is to be understood that both the foregoing general description and the following detailed description are exemplary and explanatory only and are not necessarily restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 4 is a portion of a microprogram for executing by the microcontroller; and

DETAILED DESCRIPTION OF THE INVENTION

Reference will now be made in detail to the presently preferred embodiments of the invention, examples of which are illustrated in the accompanying drawings.

Figure 1:
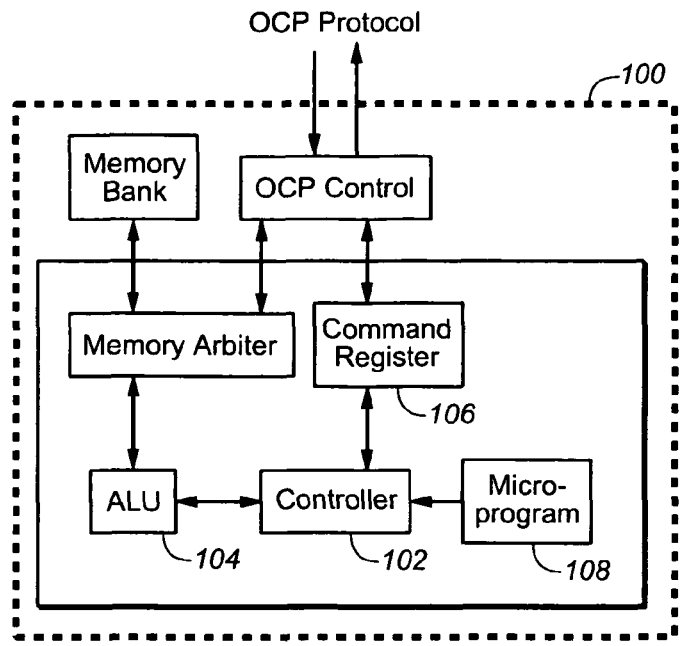
FIG. 1 is a block diagram of an arithmetic module architecture including a microcontroller.
Figure 2:
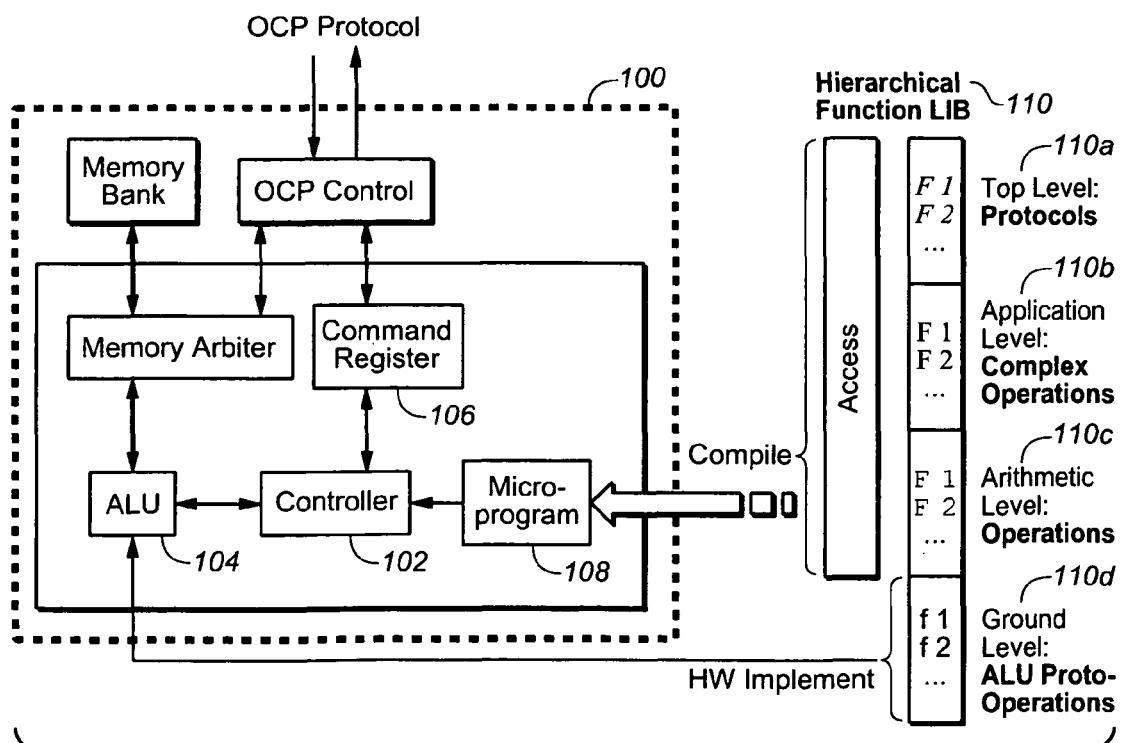
FIG. 2 is a block diagram of the arithmetic module architecture of FIG. 1, including a command language compilation.

Referring generally to FIGS. 1-2, a block diagram of an arithmetic module architecture 100 including a microcontroller 102 is shown. The microcontroller 102 may be a built-in programmable arithmetic controller, which may run and control an application-specific arithmetic logic unit (ALU) 104 and a command register 106. For instance, the ALU 104 may be a component used for arithmetic, comparative, and logic functions, and the command register 106 may be configured for storing input/output data and internal registers. Furthermore, the microcontroller 102 (including the architecture and the implementation thereof) may be utilized for cryptographic applications, including those applications related to the public key cryptography. For instance, the microcontroller 102 may be utilized for cryptographic protocols typically having hierarchical and complex computational structure, such as those involving relatively large integers and polynomials of high degree and with complex arithmetic operations.

The microcontroller 102 may be configured to execute a microprogram 108, which may be compiled prior to execution by the microcontroller 102. The microprogram 108 may consist of separate blocks of subprograms/subfunctions stored in a hierarchical function library 110 (as shown in FIG. 2) that may be called by an external control module or an external microprocessor. In the embodiment shown in FIG. 2, the hierarchical function library 110 includes 4 levels of subprograms/subfunctions: (1) a top level 110a, (2) an application level 110b, (3) an arithmetic level 110c, and (4) a ground level 110d. The top level 110a may include protocol functionality for such functions as signatures, key exchange, encryption, and the like. The application level 110b may include coding for relatively complex operations, such as those utilized in cryptosystem and cryptographic protocols, including exponentiation, inversion, point addition, doubling, and the like. The arithmetic level 110c may include operation functionally, including multiplication, addition, subtraction, comparison, module reduction, and the like. The ground level 110d may include ALU proto-operations such as register transfer, basic input/output (I/O), counters, proto-arithmetic, and the like.

The microprogram 108 may be stored in a binary table, such as that provided in a Read-Only Memory (ROM) storage module, where the microcontroller 102 may read the microprogram 108 stored in the ROM and may interpret commands from the microprogram 108. The microprogram 108, which is executed by the microcontroller 102, may be written in a special command language, which may be specially designed and adjusted for the particular ALU 104 block for the specific application to be implemented. An embodiment of a command language will be discussed below, with reference to FIGS. 3 and 4. Low-level functions/operations of the hierarchical function library 110, such as the ground level 110d functions/operations may be hardware supported in the ALU 104, such as during an ALU 104 development/implementation stage. Higher level operations, such as levels 110a-110c, may incorporate subprograms, where the subprograms call upon lower-level functions and subfunctions, and therefore may not require special hardware support in the ALU 104. Thus, the top level 110a function implementation appears as a type of microprogramming in the special command language. Such an implementation may provide flexibility to the architecture, without requiring substantive hardware requirements.

Figure 3:
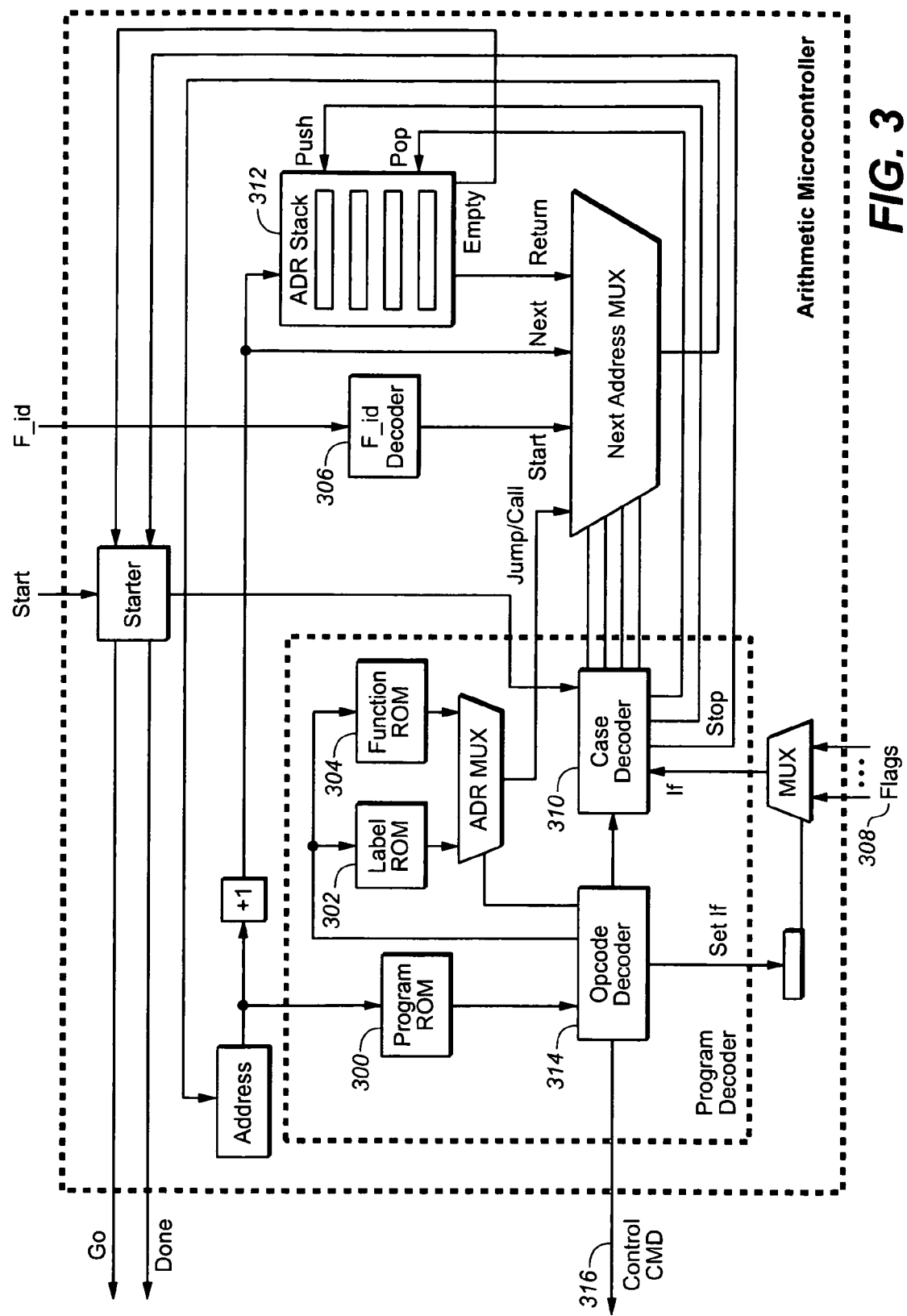
FIG. 3 is a block diagram of the microcontroller of FIG. 1.

Referring now to FIG. 3, a block diagram of an architecture of the microcontroller 102 is displayed in accordance with an embodiment of the present disclosure. The microcontroller may include four binary tables: one main binary table, PROGRAM ROM 300, and three auxiliary binary tables, LABEL ROM 302, FUNCTION ROM 304, and F_id DECODER 306.

The main binary table, PROGRAM ROM 300, may consist of binary code of the microprogram 108 which may be executed by the microcontroller 102 during runtime. LABEL ROM 302 may store addresses of commands from a main table which were labeled in the microprogram 108. FUNCTION ROM 304 may store addresses of the functions/subfunctions as entry points that may be called during execution of the microprogram. F_id DECODER 306 may be a binary table which decodes indices of functions accessible for external control into the start addresses of the PROGRAM ROM 300 table.

LABEL ROM 302 and FUNCTION ROM 304 may contain addresses used in "go to" and "call" operators/commands in the microprogram 108. In one embodiment, the microprogram contains shorter indices for LABEL ROM 302 and FUNCTION ROM 304, rather than actual addresses, which tend to be longer. By utilizing shorter indices, the compiled microprogram may be of a significantly reduced size. For instance, a microprogram written for a fully hardwired implementation of ECDSA operations (Elliptic Curve Digital Signature Algorithm operations), such as signature generation and signature verification, may have a size of less than 2 KB (with 1 K lines designated for common address space, and 12 bits for command length). The maximum number of labels and functions allowed in the microprogram 108 may be preset parameters. For example, the maximum number of labels and functions may be preset to 32.

The microcontroller 102 may additionally include FLAGS 308, CASE DECODER 310, ADR STACK 312, OPCODE DECODER 314, and CONTROL CMD 316. FLAGS 308 may include external inputs which provide feedback control from ALU 104 internal counters and comparators. FLAGS 308 may also provide for control condition branching and for the function calls in the microprogram 108. In one embodiment, only one signal from FLAGS 308 is set as active, where the active designation allows the active FLAG signal to transmit to the CASE DECODER 310 submodule. The microprogram 108 may control the switching between FLAGS 308 to select the active FLAG using specified switching commands. For example, the maximum number of FLAGS 308 may be preset to eight.

The ADR STACK 312 module may store return addresses for functional calls. The depth for functional calls may be a preset value. For example, the preset value for depth of functional calls may be an integer value ranging between 2 and 5. The OPCODE DECODER 314 module may compute a next address having a command form of a command stored in PROGRAM ROM 300 to be executed next by the microcontroller 102. Additionally, the OPCODE DECODER 314 module may send decoded data and control commands to the ALU 104. CONTROL CMD 316, which constitutes output signals from the microcontroller 102, may be a flow/sequence of microprocessor data and commands that may be further interpreted and decoded in a Command Interpreter/Opcode Decoder module within the ALU 104.

The four binary tables (PROGRAM ROM 300, LABEL ROM 302, FUNCTION ROM 304, and F_id DECODER 306) may include a compilation of microprogram 108, written as a set of functions/subfunctions. For instance, each function or subfunction may include a sequence of commands to be executed by the microcontroller 102. Functions and subfunctions may accomplish similar tasks, however, subfunctions may be configured to not be called directly by an external source. Thus, subfunction indices may not be compiled into the F_id DECODER 306 binary table, since this table may decode indices of functions accessible for external control.

Each command of a function/subfunction may consist of two portions: the first portion may be a command and/or data transferred to the ALU 104 which may be transferred to the ALU for interpreting (e.g., decoding) and executing; the second portion may be a control command for the microcontroller 102. The following is a list of commands which may be used to write microprograms (where "m" denotes a label, "d" denotes a code of operation for the ALU 104, and "par" denotes an auxiliary parameter): LABEL(m), FUNCTION(m), SUBFUNCTION(m), SEND(d), RETURN, RETURN_IF_0, RETURN_IF_1, STAND_BY, STOP, STOP_IF_0, STOP_IF_1, SET_IF(d), CALL(m), JUMP(m), JUMP_IF_1(m), JUMP_IF_0(m), SEND_EXTENDED_COM(d, par).

The above-mentioned list of commands may be defined as:
CALL(m)—call function/subfunction labeled with m;
SET_IF(d)—set IF signal to one of the feedback FLAGS 308 signals is coming from the ALU 104. This may provide feedback with the ALU 104, and may be used for conditional commands;
JUMP(m), JUMP_IF_1(m), JUMP_IF_0(m)—GOTO operator with label (m), which may provide conditional or unconditional branching in the program. For example, whether the command is conditional or unconditional depends on the input IF value;
RETURN, RETURN_IF_0, RETURN_IF_1—RETURN operators, which may provide conditional or unconditional transfer of control in the program, depending on the input IF value;
STOP, STOP_IF_0, STOP_IF_1—STOP operators, which may provide conditional or unconditional termination of the program, depending on the input IF value.

The commands LABEL(m), FUNCTION(m), and SUBFUNCTION(m) may be nonexecutable commands which may associate label "m" with the command/function following the label, and additionally may give names to the functions/subfunctions.

The microprogram 108 may include a sequence of commands. For instance, each command may start with the SEND or SEND_EXTENDED_COM commands, and then may continue with microcontroller control commands. The transfer commands, i.e., SEND and SEND_EXTENDED_COM, may be sent to the ALU 104 to be decoded and executed in the ALU 104. The SEND_EXTENDED_COM command may include an additional field for a parameter to be sent to the ALU 104. For instance, the parameter may include a memory address or an initial value for a counter. This command may not continue with the control command, such that the control command may be used for transferring the parameter.

When executing the program, the executable commands may be consecutively executed. For instance, one executable command may executed per clock cycle. The program execution may start for the function which is specified by the index with external input F_id. During command execution, transferred commands and data/parameters may be sent to the ALU 104 module for further execution. The ALU 104, in turn, may communicate with the microcontroller 102 by means of FLAGS 308 signals. In one embodiment, the communication link between the ALU 104 and the microcontroller 102 is by means of an 8-bit bus connecting the microcontroller with internal comparators and other internal submodules within the ALU 104. Thus, through this communication link, the microcontroller 102 may execute conditional branching or GOTO/RETURN/STOP types of transitions/operators depending on ALU 104 responses.

During compilation of the microprogram 108, the content of the microprogram 108 may be written into one or more of four binary tables/ROMs. The one or more of four binary tables/ROMs may either be downloaded to an internal memory module in the microcontroller 102 or be synthesized in the microcontroller 102. All executable commands may be enumerated in order as they appear in the program, thus each executable program may get index ADDRESS, which may be stored in PROGRAM ROM 300 at address ADDRESS. Additionally, the executable commands may be associated with each label/name m from the nonexecutable commands LABEL(m), FUNCTION(m), and SUBFUNCTION(m), which may be the index of the following executable command in the program, i.e., the index of the next command following the label command or the function/subfunction declaration.

Three auxiliary ROMS may contain addresses for the corresponding indices. For instance, LABEL ROM 302 stores addresses of the labels as the labels appear in the program. FUNCTION ROM 304 may store addresses of the functions/subfunctions as the functions/subfunctions appear in the program. F_id DECODER ROM 306 may store addresses of the functions for allowable direct external calls. By storing the table/ROM indices in the main program, rather than actual addresses, the microprogram 108 may be of a substantially reduced size. The capacity of each of the ROMs should be sufficient to store the compiled programs. For example, to fully implement ECDSA operations, the main program table may be 1024 lines, with 12 bits per each line, and 32 lines for labels and two functional tables, with 10 bits per each line.

A sample microprogram written with basic commands may be presented as:

```
FUNCTION("F0");
    1   SEND(cmd_1); SET_IF(port_C);
    2   SEND(cmd_2); JUMP_IF_0("L0");
    3   SEND_EXTENDED_COM(cmd_3, 40);
    4   SEND(cmd_D); RETURN;
LABEL("L0");
    5   SEND(cmd_3); CALL("F1");
    6   SEND(cmd_B); STOP;
SUBFUNCTION("F1")
    7   SEND(cmd_1); SET_IF(port_D);
LABEL("L1");
    8   SEND_EXTENDED_COM(cmd_2, 31);
    9   SEND(cmd_5);
    10  SEND(cmd_6); JUMP_IF_1("L1");
    11  SEND(cmd_7); SET_IF(port_B);
    12  SEND(cmd_8); JUMP_IF_0("L2");
    13  SEND(cmd_D); RETURN;
LABEL("L2");
    14  SEND(cmd_9); SET_IF(port_E);
    15  SEND(cmd_A); RETURN_IF_0;
    16  SEND(cmd_D); RETURN;
```

Based on the basic commands described above, a microprogramming language may be designed for a developed ALU 104 specifically for a particular arithmetic/cryptographic application. Developing the ALU 104 and implementing commands for the ALU 104 may be a combined and united process. For instance, a microcontroller may be built specially designed and adjusted for the particular ALU module, as a match for the specific tasks/protocols that are desirably implemented. Higher-level operations, including the top level 110a, the application level 110b, and the arithmetic level 110c, are implemented by calling lower level functions/subfunctions, and thus, may not require special hardware support in the ALU 104 or in implementation of the top level protocols 110a.

The microprogramming language may be defined via generic basic commands, as in the following example (where in the comments "mem" means internal memory, and "rnd" means random):

```
IDLE           SEND(cmd_0) // NOP
MOVE_M_X       SEND(cmd_1) // mem -> X
MOVE_M_Y       SEND(cmd_2) // mem -> Y
MOVE_M_XY      SEND(cmd_3) // mem -> X, mem -> Y
SEED_X         SEND(cmd_4) // X -> rnd (seed)
RAND_X         SEND(cmd_5) // rnd -> X
SWAP_X_Y       SEND(cmd_8) // X <--> Y
COMPL_X        SEND(cmd_9) // X = ~X bitwise
ONE_X          SEND(cmd_D) // X = 000...0001
. . .
```

The list of commands may be extended depending upon the desired application and the particular ALU under development.

These commands may be utilized to developed a microprogram for implementing high-level protocols. For example, see the following microprogram:

```
SUBFUNCTION("SF_clean_io");
    CLEAR_STS           ;
    READ_M(addr_of_seed);
    MOVE_M_X            ;
    SEED_X              ;
    ONE_X               ;
    . . .
```

-continued

```
FUNCTION("F1_ecdsa_verification");
    CLEAR_SIG           ;
    READ_M(addr_of_input   );
    SAVE_M(addr_of_P_X     );
    READ_M(addr_of_input + 1);
    SAVE_M(addr_of_P_Y     );
    READ_M(addr_of_input + 2);
    . . .
FUNCTION("F2_mul_point");
    READ_M(addr_of_input   );
    SAVE_M(addr_of_K       );
    READ_M(addr_of_input + 1);
    SAVE_M(addr_of_Q_X     );
    READ_M(addr_of_input + 2);
    SAVE_M(addr_of_Q_Y     );
    READ_M(addr_of_input + 3);
    SAVE_M(addr_of_seed    );
    ONE_X;
    . . .
```

For another example of a microprogram, refer to FIG. 4, where a portion of an ECDSA microprogram for executing by the microcontroller 102 is displayed. The portion shown in FIG. 4 is an excerpt from an approximately 1000 line program, which is written for full hardware implementation of ECDSA operations (e.g., signature verification, signature generation, public key generation, validation, and the like).

The present disclosure is described below with reference to flowchart illustrations of methods. It will be understood that each block of the flowchart illustrations and/or combinations of blocks in the flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart. These computer program instructions may also be stored in a computer-readable tangible medium (thus comprising a computer program product) that can direct a computer or other programmable data processing apparatus to function in a particular manner, such that the instructions stored in the computer-readable tangible medium produce an article of manufacture including instruction means which implement the function/act specified in the flowchart.

Figure 5:
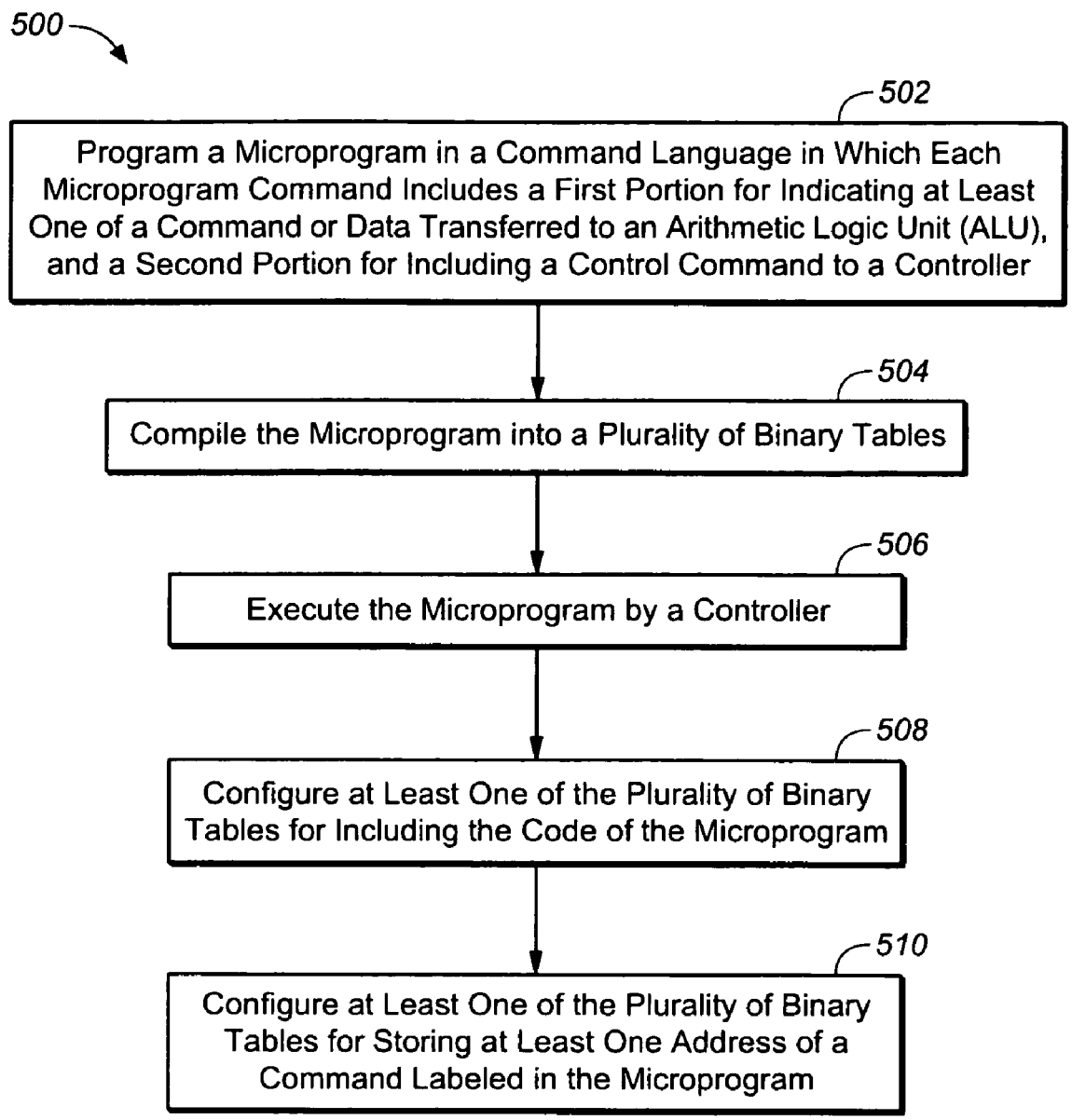
FIG. 5 is a flow chart illustrating a method for implementing a programmable arithmetic controller.

Referring now to FIG. 5, a flow chart is displayed illustrating a method 500. Method 500 may program a microprogram in a command language in which each microprogram command includes a first portion for indicating at least one of a command or data transferred to an arithmetic logic unit (ALU), and a second portion for including a control command to a controller 502. Method 500 may compile the microprogram into a plurality of binary tables 504. The microprogram may be configured for performing at least one of hierarchical or a sequence of polynomial computations. Method 500 may execute the microprogram by a controller 506. Method 500 may configure at least one of the plurality of binary tables for including the code of the microprogram 508. Method 500 may configure at least one of the plurality of binary tables for storing at least one address of a command labeled in the microprogram 510.

Method 500 may further configure at least one of the plurality of binary tables for storing addresses of at least one of a function or a subfunction as an entry point for calling during execution of the microprogram. Method 500 may further configure at least one of the plurality of binary tables for decoding indices of functions accessible for external control. Method 500 may further perform at least one of editing the microprogram or generating binary tables, during which a controller netlist remains unchanged. Compiling the microprogram into a plurality of binary tables of method 500 may include compiling the microprogram into a PROGRAM ROM binary table, a LABEL ROM binary table, a FUNCTION ROM binary table, and an F_id DECODER binary table. Additionally, compiling the microprogram into a plurality of binary tables of method 500 may include compiling the microprogram from a hierarchical function library. Further, method 500 may store separate blocks of subprograms and subfunctions in at least four levels of subprograms and subfunctions, the at least four levels include a top level for including protocols, an application level for including relatively complex operational functionality, an arithmetic level for including operational functionality, and a ground level for including initial ALU operations. Method 500 may further provide hardware support for only the ground level. For instance, the top level, the application level, and the arithmetic level may not require hardware support.

The arithmetic module architecture 100 may be configured to process and implement hierarchical arithmetical/polynomial computations typical for various cryptosystems and for common cryptographic protocols. For example, the arithmetic module architecture 100 may be configured to process and implement computations from ECC/HECC (Elliptic Curve Cryptography/HyperElliptic Curve Cryptography) cryptosystems over a finite field $GF(2^n)$ or $Z_p$ for relatively large integers n and p (or more generally over $G(p^n)$, where p is a relatively small prime number, e.g., p=3 or p=7, and n is a relatively large number). Additionally, the arithmetic module architecture 100 may be configured to process and implement computations from RSA (Rivest-Shamir-Adelman) cryptosystems over $Z_n$, where n=p*q, for relatively large prime numbers p and q. Further, the arithmetic module architecture 100 may be configured to process and implement computations from DH-based (Diffie-Hellman) cryptographic protocols over $Z_p$, including other algebraic groups with relatively difficult discrete logarithm computation. Still further, the arithmetic module architecture 100 may be configured to process and implement computations from ECC/HECC pairing-based cryptography over $GF(2^n)$ or $Z_p$ (e.g., multiparty key exchange schemes, identity-based encryption/decryption, and the like). It is appreciated that the arithmetic module architecture 100 may be configured to process and implement computations from other cryptographic applications and protocols without departing from the scope of the present disclosure.

In the present disclosure, the methods disclosed may be implemented as sets of instructions or software readable by a device. Such a software package may be a computer program product which employs a computer-readable storage medium including stored computer code which is used to program a computer to perform the disclosed function and process of the present disclosure. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. An architecture comprising:
a controller, the controller configured to receive a microprogram, the microprogram configured for performing at least one of hierarchical or a sequence of polynomial computations;
an arithmetic logic unit (ALU) communicably coupled to the controller, the ALU controlled by the controller; and
a hierarchical function library including a memory, the hierarchical function library storing separate blocks of subprograms and subfunctions in at least four levels of subprograms and subfunctions, wherein the at least four levels include a top level for including protocols, an application level for including relatively complex operational functionality, an arithmetic level for including operational functionality, and a ground level for including initial ALU operations;
wherein the microprogram is compiled prior to execution by the controller, the microprogram is compiled into a plurality of binary tables, and the microprogram is programmed in a command language in which each command includes a first portion for indicating at least one of a command or data transferred to the ALU, and a second portion for including a control command to the controller, and wherein the plurality of binary tables includes a PROGRAM ROM binary table, a LABEL ROM binary table, a FUNCTION ROM binary table, and an F_id DECODER binary table, the PROGRAM ROM binary table including binary code of the microprogram to be executed during runtime, the LABEL ROM binary table including addresses of commands labeled in the microprogram, the FUNCTION ROM binary table including addresses of functions and subfunctions as entry points to be called during execution, and the F_id DECODER binary table including indices of functions accessible for external control for decoding.

2. The architecture of claim 1, wherein the microprogram includes indices for the LABEL ROM binary table and the FUNCTION ROM binary table, the indices requiring less memory than full addresses of commands.

3. The architecture of claim 1, wherein only the ground level requires direct hardware support for implementation.

4. A method comprising:
programming a microprogram in a command language in which each microprogram command includes a first portion for indicating at least one of a command or data transferred to an arithmetic logic unit (ALU), and a second portion for including a control command to a controller;
compiling the microprogram into a plurality of binary tables, the microprogram configured for performing at least one of hierarchical or a sequence of polynomial computations, wherein compiling the microprogram into a plurality of binary tables includes compiling the microprogram from a hierarchical function library;
executing the microprogram by a controller;
configuring at least one of the plurality of binary tables for including the code of the microprogram;
configuring at least one of the plurality of binary tables for storing at least one address of a command labeled in the microprogram; and
storing separate blocks of subprograms and subfunctions in at least four levels of subprograms and subfunctions, the at least four levels include a top level for including protocols, an application level for including relatively complex operational functionality, an arithmetic level for including operational functionality, and a ground level for including initial ALU operations;
wherein the plurality of binary tables includes a PROGRAM ROM binary table, a LABEL ROM binary table, a FUNCTION ROM binary table, and an F_id DECODER binary table, the PROGRAM ROM binary table including binary code of the microprogram to be executed during runtime, the LABEL ROM binary table including addresses of commands labeled in the microprogram, the FUNCTION ROM binary table including addresses of functions and subfunctions as entry points to be called during execution, and the F_id DECODER binary table including indices of functions accessible for external control for decoding.

5. The method of claim 4, further including configuring at least one of the plurality of binary tables for storing addresses of at least one of a function or a subfunction as an entry point for calling during execution of the microprogram.

6. The method of claim 4, further including configuring at least one of the plurality of binary tables for decoding indices of functions accessible for external control.

7. The method of claim 4, further including performing at least one of editing the microprogram or generating binary tables, during which a controller netlist remains unchanged.

8. The method of claim 4, further comprising providing hardware support for only the ground level.

9. A system comprising:
a controller, the controller configured to receive a microprogram, the microprogram configured for performing at least one of hierarchical or a sequence of polynomial computations;
an arithmetic logic unit (ALU) communicably coupled to the controller, the ALU controlled by the controller;
a command register communicably coupled to the controller, the command register controlled by the controller and configured for storing at least one of input data, output data, or internal registers; and
a hierarchical function library including a memory, the hierarchical function library storing separate blocks of subprograms and subfunctions in at least four levels of subprograms and subfunctions, wherein the at least four levels include a top level for including protocols, an application level for including relatively complex operational functionality, an arithmetic level for including operational functionality, and a ground level for including initial ALU operations;
wherein the microprogram is compiled prior to execution by the controller, the microprogram is compiled into four binary tables, and the microprogram is programmed in a command language in which each command includes a first portion for indicating at least one of a command or data transferred to the ALU, and a second portion for including a control command to the controller, and wherein the four binary tables include a PROGRAM ROM binary table, a LABEL ROM binary table, a FUNCTION ROM binary table, and an F id DECODER binary table, the PROGRAM ROM binary table including binary code of the microprogram to be executed during runtime, the LABEL ROM binary table including addresses of commands labeled in the microprogram, the FUNCTION ROM binary table including addresses of functions and subfunctions as entry points to be called during execution, and the F_id DECODER binary table including indices of functions accessible for external control for decoding.

10. The system of claim 9, wherein the microprogram includes indices for the LABEL ROM binary table and the FUNCTION ROM binary table, the indices requiring less memory than full addresses of commands.

* * * * *